United States Patent [19]

Melvin

[11] 4,433,874
[45] Feb. 28, 1984

[54] CRAWLER SHOE HAVING WORK-HARDENED PIN-RECEIVING HOLE

[75] Inventor: Raymond C. Melvin, Elm Grove, Wis.

[73] Assignee: Harnischfeger Corporation, Brookfield, Wis.

[21] Appl. No.: 347,897

[22] Filed: Feb. 11, 1982

[51] Int. Cl.³ ............................................. B62D 55/20
[52] U.S. Cl. .................................. 305/53; 305/58 R; 72/120
[58] Field of Search ........................ 305/39, 53, 58 R; 29/148.4 R, 149.5 R; 72/120; 59/74, 78; 474/228, 230, 231

[56] References Cited

U.S. PATENT DOCUMENTS 3,594,048  7/1971  Korner et al. ........................ 305/58
3,911,707  10/1975  Minakov et al. ................. 72/120 X
4,278,301  7/1981  Gregor et al. ..................... 305/53 X

FOREIGN PATENT DOCUMENTS 632900  12/1961  Canada .................................. 305/39

Primary Examiner—David A. Scherbel
Attorney, Agent, or Firm—James E. Nilles

[57] ABSTRACT

A crawler shoe for a mining shovel or the like includes a portion in which a cylindrical hole is provided for receiving a steel pin which pivotally connects the crawler shoe to an adjacent shoe. The portion in which the hole is provided is fabricated of a work-hardenable steel alloy, such as Hadfield-Manganese Alloy, and the wall of the hole is work-hardened by a tool which expands the diameter of the hole slightly and at the same time compresses and hardens the steel defining and adjacent the hole to a predetermined depth and to a predetermined degree of hardness. The tool comprises a plurality of radially arranged, slightly skewed, rotatable rollers which are mounted on a rotatable body insertable into the hole and which are movable radially outwardly to roll and exert pressure on the wall surface defining the hole.

1 Claim, 9 Drawing Figures

CRAWLER SHOE HAVING WORK-HARDENED PIN-RECEIVING HOLE

BACKGROUND OF THE INVENTION

1. Field of Use

This invention relates generally to an article of manufacture such as a crawler track shoe for a mining shovel or the like, having a cylindrical hole for receiving a pin which pivotally connects the shoe to an adjacent shoe.

The invention further relates to a method for providing such an article in which the wall defining the hole is work-hardened to reduce wear caused by pin movement and tension loads.

2. Description of the Prior Art

Some large heavy-duty machines such as mining shovels, tractors, cranes and the like, employ ground-engaging crawler type assemblies for support and propulsion. These assemblies include endless crawler tracks which are made up of individual crawler track shoes which are pivotally connected to one another by pivot pins which engage holes in the shoes. Such shoes, which are typically manufactured from cast or machined steel alloy castings, are subjected to severe wear and abrasion on those surfaces which contact the ground or bear against other metal components. For example, in a crawler shoe the distance between the pins which connect one shoe to another changes as the shoe and pin holes are subjected to operational forces. The pin wears the hole surface and also causes the hole or hole supporting structure to lengthen. This change in pitch from shoe to shoe creates secondary problems on the driving mechanism, normally called the tumbler. Heretofore, the shoes and pins were made of various types of wear-resistant steel alloys in an effort to overcome or reduce the aforementioned problems. Some alloys which have desirable hardness characteristics when cast are difficult and costly to machine after casting. It is known, however, that some manganese steel alloys can be hardened after casting and machining by subjecting them to the application of force from external energy sources. Thus, the normal way of hardening such alloys is through operations such as machining, through impact such as hammering or shot peening, or through impact occurring under normal operating conditions. One type of alloy identified as Hadfield Manganese Steel Alloy changes from a hardness of about 23 Rockwell C up to about 50 or 55 Rockwell C. This increased hardness not only increases wear resistance but also reduces potential dimensional changes in the finished product.

SUMMARY OF THE PRESENT INVENTION

In the process of experimenting with various alloys applicant has invented or discovered an improved article of manufacture, such as a crawler shoe for a mining shovel or the like, and improved method for making the same.

More specifically, an article such as a crawler shoe in accordance with the invention includes a portion in which a cylindrical hole is provided for receiving a steel pin which pivotally connects the crawler shoe to an adjacent shoe. The portion in which the hole is provided is fabricated of a work-hardenedable steel alloy, such as Hadfield-Manganese Alloy, and the wall of the hole is work-hardened by a tool which expands the diameter of the hole slightly and at the same time compresses and hardens the steel defining and adjacent the hole to a predetermined depth and to a predetermined degree of hardness.

The tool is a commercially available device which is used for another purpose and generally comprises a plurality of radially arranged, slightly skewed, rotatable, radially movable rollers which are mounted on a rotatable body. The body is insertable into the hole and rotated and the rollers move radially outwardly to roll and exert pressure on the wall surface defining the hole.

The method in accordance with the invention for manufacturing a component having a hole with a work-hardened surface therein comprises the steps of providing a component having a portion which comprises a work-hardenable alloy; forming a cylindrical hole having a smooth wall surface in that portion; providing a tool of the aforesaid character having at least one rotatable roller which is rotatable about an axis generally parallel to the axis of the hole; inserting the tool into the hole and rotating the roller while forcing the roller against the wall surface to effect enlargement of the diameter of the hole, and to effect compression of the alloy adjacent the wall surface to a predetermined depth and to a predetermined degree of hardness. In an embodiment disclosed herein where the hole has a diameter of about three inches the predetermined depth was on the order of one-tenth of an inch (0.10") and the predetermined degree of hardness was on the order of 45 on the Rockwell C hardness scale.

By prehardening the hole as above-described, three significant improvements are obtained: First, the hole has its entire inside diameter hardened to resist indentation by the mating pin. Second, resistance to stretching or movement of the entire supporting structure of the hole is increased by hardening the entire surface. Third, the wear resistance during the initial running time is improved because the prehardened hole has the ability to reject foreign particles. An additional feature is that the surface finish of the hole (whether machined or in the as cast condition) is significantly improved, thereby increasing the contact between the pin and hole surface.

The process to improve the surface finish and hardness utilizes a tube expanding mechanism or tool which is commercially available and is similar to a burnishing tool but is normally used in the bakery and dairy industry to effect expansion of the inside and outside diameters of stainless steel tubes.

DRAWINGS

DESCRIPTION OF PREFERRED EMBODIMENTS

Figure 1:
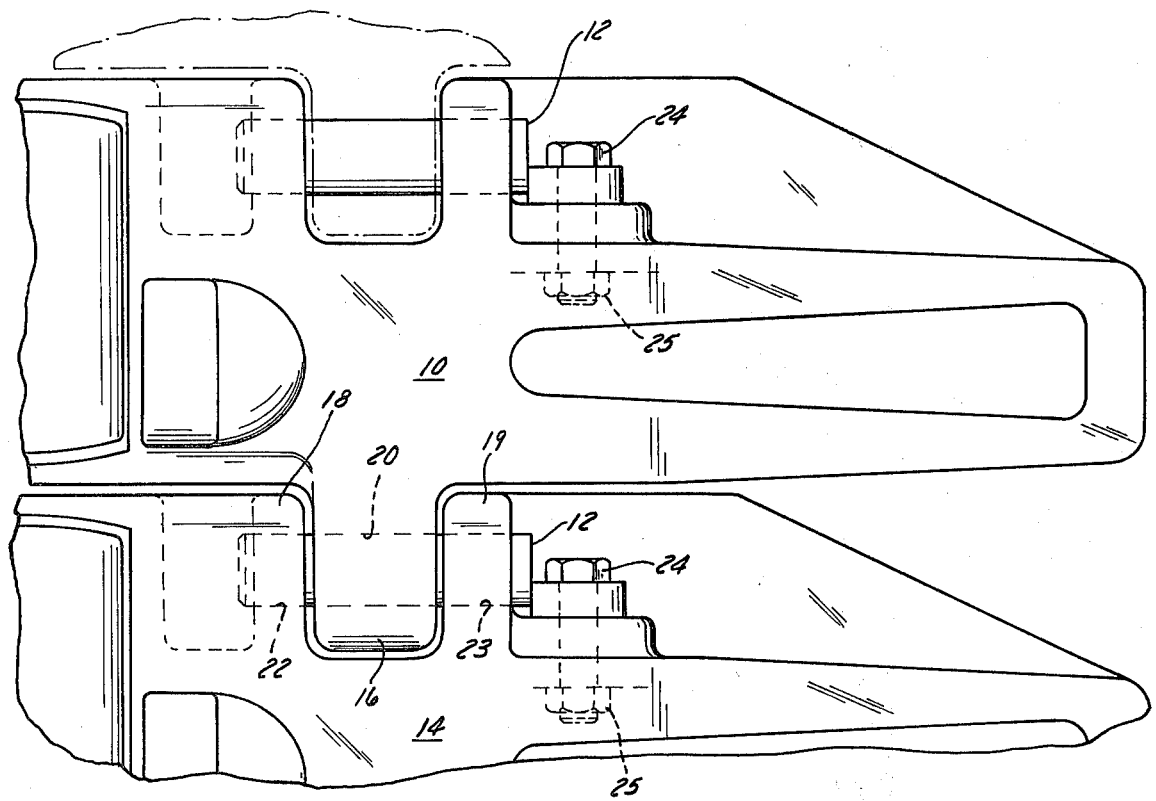
FIG. 1 is a top plan view of portions of two adjacent crawler shoes for a machine, such as a mining shovel, which are pivotally secured together by a removable pin.
Figure 2:
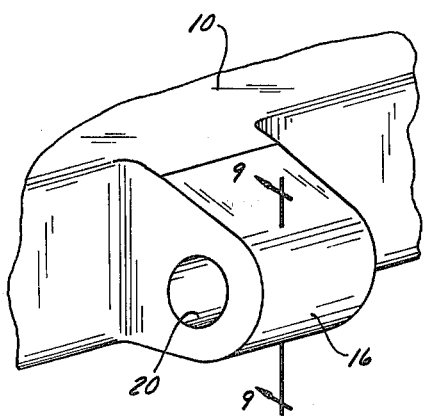
FIG. 2 is a perspective view showing a portion of one of the shoes of FIG. 1 in which a pin-receiving hole is provided.

Referring to FIGS. 1 and 2, the numeral 10 designates an article such as a crawler shoe which is pivotally connected by a pivot pin 12 to another adjacent crawler shoe 14 to provide a portion of a crawler track for a machine such as a mining shovel (not shown) or the like. Shoe 10 comprises a projecting portion 16 which extends between two complimentary projecting portions 18, 19 in shoe 14 and portion 16 includes a pin-receiving hole or bore 20 therethrough which is axially aligned with the bores 22, 23 in the portions 18, 19, respectively. The pin 12 extends through bore 23, through bore 20 and into bore 22 and is secured against accidental axial withdrawal by the interfering head of a removable bolt or screw 24 which extends into a hole in shoe 14 and has a nut 25.

Figure 9:
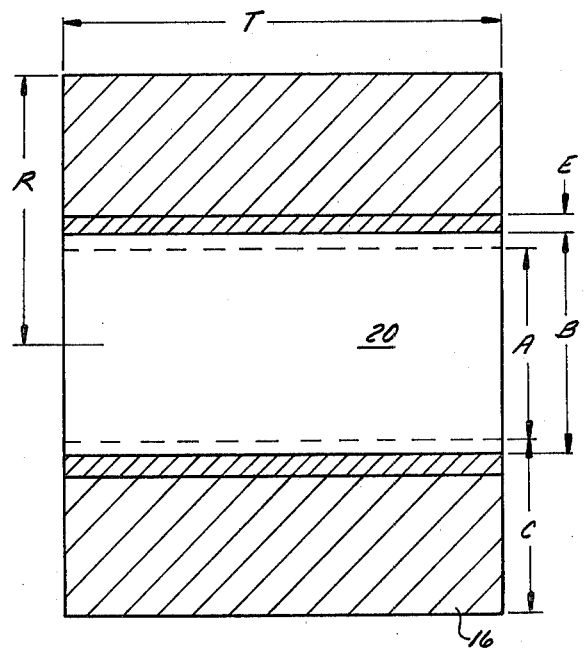
FIG. 9 is a greatly enlarged cross-section view taken on line 9—9 of FIG. 2 and showing significant dimensions related to the pin-receiving opening.

As FIGS. 1, 2 and 9 make clear, projecting portion 16 of shoe 10 takes the form of a semi-circle having a radius of about 3" (dimension R in FIG. 9) and about 5" thick (dimension T in FIG. 9). Hole 20 therethrough, when in finished form, is cylindrical and is about 5" long (dimension T in FIG. 9) and 3" in diameter (dimension B in FIG. 9). Hole 20 is initially formed by casting and, preferably, is subsequently machined as by drilling or boring to provide a relatively smooth bore of desired diameter but this is not essential.

Shoe 10 is fabricated by casting from a work-hardenable steel alloy which is machined as required to provide (or improve upon) bore 20 and other features (not shown) and which is then work-hardened on its outer surfaces by hammering or shot-peening and hardened within bore 20 by a process in accordance with the invention hereinafter described.

The work-hardenable steel alloy includes, but is not limited to, the following: high carbon steel alloys containing over 70 points of carbon; Austenetic manganese steel alloys; Hadfield manganese steel alloys; Inconel steel alloys; or any other work-hardenable steel alloys in which the hardness level can be substantially raised by working, as by applying pressure or force from hammering, from shot-peening, or from application of tools. Other non-steel metal alloys which are work-hardenable, such as some aluminum alloys, are within the scope of the invention.

Figure 3:
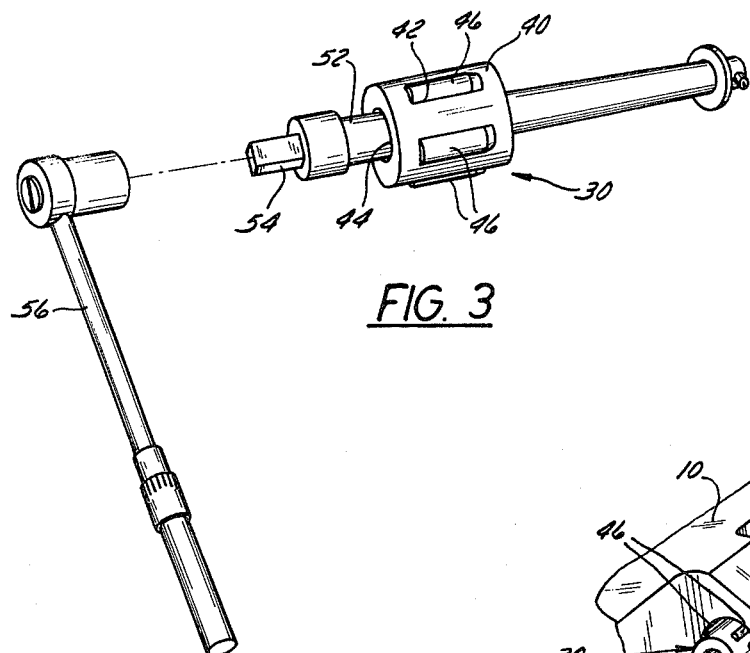
FIG. 3 is an exploded perspective view of a roller tool and torque wrench therefore, which tool is used for hardening the wall of the pin-receiving hole of FIG. 2.

Referring to FIG. 3, the numeral 30 designates a tool which is employed to work-harden bore 20 in shoe 10 in accordance with the invention, such a tool or its equivalent being employed because bore 20 does not lend itself to shot-peening or hammering or similar work-hardening procedures and because conventional burnishing techniques to work-harden bore 20 are time consuming and costly and cannot harden to the necessary depth or provide the necessary dimensional control.

Tool 30 takes the form of a commercially available tube expander, such as that manufactured by the Elliott Company, Springfield, Ohio 45501, which is especially designated and used to swedge or expand both the inside and outside diameters of the end joints of thin wall stainless steel tubing, such as is used in sanitary installations as in bakeries and dairies, to ensure joints tight enough to prevent leakage and small enough to reduce or eliminate bacteria growth. Similar tools are employed to roll the ends of boiler tubes and effect inside and outside diameter increases whereby the tubes engage the boiler headsheets. A tool such as 30 and its operation as a tube expander is shown and described at pages 28 through 31 of the Cherry-Burrell Clamp, Fitting & Valve Catalog published by the Cherry-Burrell Company, Cedar Rapids, Iowa 52406. In so far as applicant is aware, such tools are not intended for and have not heretofore been used to enlarge and work-harden the surface of a hole in work-hardenable materials such as manganese steel alloys or high-carbon steel alloys. Stainless steel and ordinary steel tubing on which these tools are usually employed are not work-hardenable.

Figure 5:
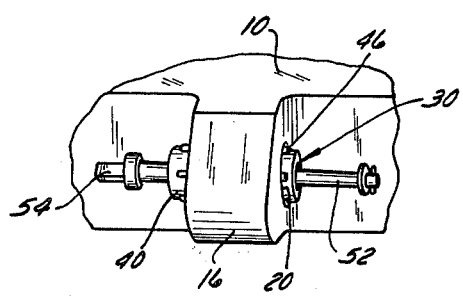
FIG. 5 is an end view showing the tool of FIG. 3 disposed in the pin-receiving hole of the crawler shoe.
Figure 6:
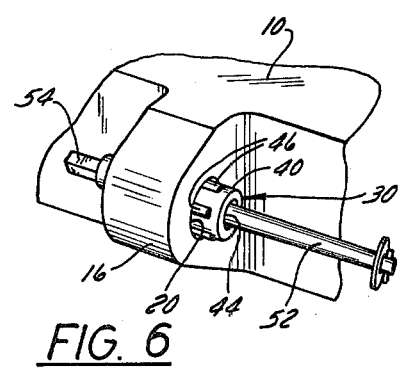
FIG. 6 is another perspective view showing the tool of FIG. 3 disposed in the pin-receiving hole of the crawler shoe.
Figure 7:
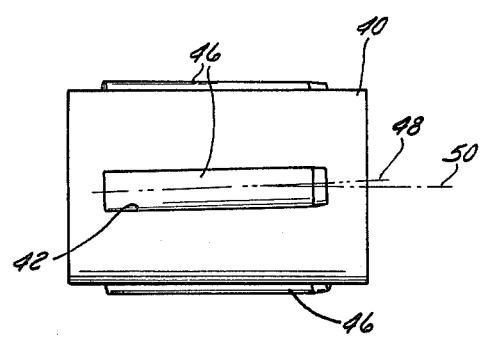
FIG. 7 is a side elevational view of the tool of FIG. 3 but showing the rollers thereof prior to expansion.
Figure 8:
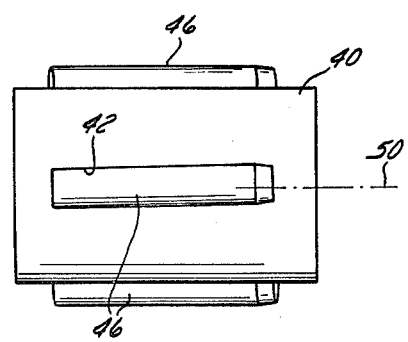
FIG. 8 is a view similar to FIG. 7 but showing the rollers after their maximum expansion.

As FIGS. 3, 4, 5, 6, 7 and 8 show, tool 30 comprises a cylindrical housing 40 having a plurality of elongated slots 42 arranged radially therearound and having an axial bore 44 extending therethrough. Each slot 42 accommodates a roller 46 which is disposed on an axis of rotation 48 which is slightly skewed with respect to the axis of rotation 50 of housing 40. Bore 44 of housing 40 accommodates a conical tapered rotatable pin 52 which has a square end portion 54 which is engageable by a torque wrench 56 shown in FIG. 3. Rotation of pin 52 by wrench 56 causes the rollers 46 to rotate and also to expand or move outwardly from the slots 42 in which they are arranged, as comparison of FIGS. 7 and 8 shows, as the tapered pin 52 moves axially into bore 44 of housing 40.

Figure 4:
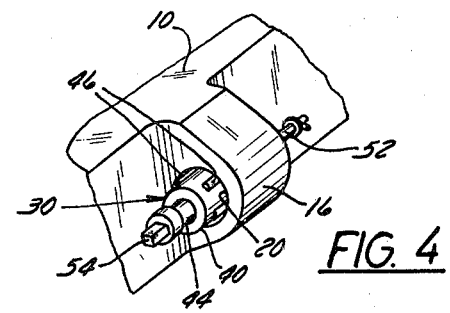
FIG. 4 is a perspective view showing the tool of FIG. 3 disposed in the pin-receiving hole of the crawler shoe.

As FIGS. 4, 5 and 6 show, tool 30 is inserted into bore 20 of shoe 10 and wrench 56 is connected to end 54 of tapered pin 52 and operated to effect rotation of pin 52. As such rotation occurs, the rollers 46 rotate and also gradually emerge from their slots 42 and rotatingly engage the wall of bore 20 in shoe 10. Continued rotation of pin 52 causes the rollers 46 to exert substantial force on the wall surface of bore 20 (i.e., a force on the order of a minimum of 50,000 pounds per square inch, for example) as the rollers roll around the wall surface. In practice, in a bore 20 of the size hereinbefore described, fifteen rotations of pin 52 and the rollers 46 driven thereby had the following effect: First, as FIG. 9 shows, the diameter of bore 20 increased from its original diameter A to a new diameter B for an actual increase in diameter of about nine-thousandths of an inch. Second, as FIG. 9 shows, the alloy adjacent the wall of the bore 20 was permanently compressed or increased in density for a distance E which in actuality, measured one-tenth of an inch (0.10"). Third, the hardness of the alloy from the wall surface of bore 20 to depth E increased from a Rockwell C hardness of 22 to a Rockwell C hardness of 45. Thus, this rotational work-hardening action hardened the wall surface of bore 20 to produce a wall surface of superior hardness as compared to that produced by prior art methods and also produced a surface finish which, as hereinbefore explained, increased the longevity of hole 20 and pin 12 therefor.

It is to be understood that the torque for rotatably driving pin 52, instead of being applied manually by torque wrench 56 could be applied by suitable electrically, pneumatically, hydraulically or other-powered means. Furthermore, the size or extent of hole diameter expansion (i.e., tool expansion) can be controlled and maintained by limiting or controlling the amount of advance of tapered pin 52 into the bore 44 of housing 40 of tool 30 by means of some type of mechanical stop member (not shown).

It is to be further understood that, although the invention is herein described in detail only in connection with hole 20 in shoe 10, the pin holes 22 and 23, as well as other holes (not shown) in shoes 10 and 14 could be similarly hardened in accordance with the present invention.

In the embodiment disclosed herein, the hole whose inner wall surface is to be work-hardened is provided in a body of material fabricated of a suitable alloy. It is within the scope of the invention to provide a body of material which is not work-hardenable but to then provide an insert made of work-hardenable material in the larger body and then to provide the hole which is to be work-hardened in the insert. As will be understood, the insert could be cast in the larger body or it could be inserted and suitably secured within a hole in the larger body.

It is to be further understood that in all embodiments of the invention disclosed herein, an increase in the diameter of the hole to be work-hardened is accompanied by compression of the work-hardenable material immediately adjacent the wall surface of the hole but does not result in an increase in the external size or outside diameter of the body in which the hole being work-hardened exists.

I claim:

1. As an article of manufacture:
a crawler shoe for a mining shovel or the like, said shoe having an outer surface and having a portion in which a cylindrical hole is provided for receiving a pin which pivotally connects the shoe to an adjacent shoe, said shoe being fabricated of work-hardenable Hadfield-manganese steel alloy, said outer surface of said shoe being work-hardenable, and the wall of said hole being work-hardened by rolling a rotatable member thereagainst so that the steel alloy defining and adjacent the hole is compressed to a predetermined depth on the order of one-tenth of an inch and to a predetermined degree of hardness on the order of 45 on the Rockwell "C" hardness scale from an initial untreated degree of hardness on the order of 23 on the Rockwell "C" hardness scale.

* * * * *